United States Patent
Ai et al.

(10) Patent No.: US 12,493,544 B2
(45) Date of Patent: Dec. 9, 2025

(54) LINKING AUTOMATE TESTING USING MULTIPLE TOOLS

(71) Applicant: SAP SE, Walldorf (DE)

(72) Inventors: Zhijie Ai, Shanghai (CN); Dan Liu, Nanjing (CN)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 18/306,639

(22) Filed: Apr. 25, 2023

(65) Prior Publication Data

US 2024/0362156 A1 Oct. 31, 2024

(51) Int. Cl.
*G06F 11/3668* (2025.01)

(52) U.S. Cl.
CPC ...... *G06F 11/3688* (2013.01); *G06F 11/3684* (2013.01)

(58) Field of Classification Search
CPC .......... G06F 11/3688; G06F 11/3684
See application file for complete search history.

(56) References Cited

U.S. PATENT DOCUMENTS

| | | | |
|---|---|---|---|
| 11,474,934 B1 * | 10/2022 | Pereira | G06F 11/3698 |
| 12,204,439 B2 * | 1/2025 | Balgi | G06F 11/3688 |
| 2007/0094541 A1 * | 4/2007 | Kang | G06F 11/3688 |
| | | | 714/38.1 |
| 2011/0088018 A1 * | 4/2011 | Foley | G06F 11/3684 |
| | | | 717/124 |
| 2015/0039941 A1 * | 2/2015 | Kalyanasundram | |
| | | | G06F 11/3692 |
| | | | 714/38.1 |
| 2018/0285246 A1 * | 10/2018 | Tuttle | G06F 11/3414 |
| 2018/0349256 A1 * | 12/2018 | Fong | G06F 40/284 |
| 2020/0356469 A1 * | 11/2020 | Gupta | G06F 3/0484 |
| 2022/0350731 A1 * | 11/2022 | Ding | G06F 11/3684 |

* cited by examiner

*Primary Examiner* — Wei Y Mui
*Assistant Examiner* — Travis Viet Tran
(74) *Attorney, Agent, or Firm* — Buckley, Maschoff & Talwalkar LLC

(57) ABSTRACT

According to some embodiments, systems and methods are provided including receiving a definition for a scenario including a plurality of operation steps, wherein a first and second operation step is executable by a respective first and second application under test; recording a first and second test script for the respective first and second operation steps of the scenario with a respective first and second test automation tool; receiving a first and second test script identifier for the recorded respective first and second test script at a persistence proxy layer; updating the definition of the scenario; receiving the recorded first and second test scripts at an orchestrator; identifying one of the first application under test and the second application under test for each operation step in the updated scenario; and executing one of the first and second test scripts based on the scenario definition. Numerous other aspects are provided.

20 Claims, 9 Drawing Sheets

```
Scenario 1: Create a Sales Order (SO) and Outbound Delivery for SAPGUI and FIORI ┌ Given Login to SAPGUI
        │ Then create a Sales Order via T-Code "va01" by script "01_create_sales_order.vbs"
        │ Then Store the result last script to "last_so_number"
        │
        │ Given Login to FIORI "edit_sales_order" with "user_name" and "password"
   404 ─┤ Then edit "last_so_number" by appending a sales order item
        │
        │ Given Login to SAPGUI
        │ Then create an outbound delivery via T-code "vl01n" by script "02_crt_deliver_outbound.js"
        └ Then Store the result of last script to "last_outb_dlv_number"

Work.js
        ┌ function ("given Login to SAPGUI",{
   406a ─┘     foo ();
              bar ();
              api.scheduler.call_app1_script ("va01", "abc.vbs");
});
   402 ─┤ function ("Store the result last script to "last_so_number",{
   406b ─┘     var result_of_last_so = api.storage ("last_so_number");

assertion (result_of_last_so == 1)"
});
```

FIG. 4

LINKING AUTOMATE TESTING USING MULTIPLE TOOLS

BACKGROUND

Many organizations are increasingly dependent on software user interface (UI) applications, executed on-premise or in the cloud, that are developed to address their needs. The UI applications may be tested by test automation tools to verify functional and/or non-functional requirements via automated test scripts. The test automation tool may be an application/software that is separate from the software being tested to control the execution of test scripts, and the comparison of actual outcomes with predicted outcomes. An organization may want to use the test automation tool to test an end-to-end (E2E) scenario. An E2E scenario may include a sequence of process steps that may be supported by tools that execute program code to perform each of the steps automatically with minimal input from a user. The process steps may be performed by different tools, and each tool may have its own test automation tool to test their respective functionality. Additionally, while a test automation tool may be used to test functionality in multiple different tools, the test automation tool may be better suited to testing the steps it was designed to test.

Systems and methods are desired which make it easier to test the complete E2E scenario including testing across different environments, different configurations and different tools.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4 is an example of a display according to some embodiments.

Figure 1:
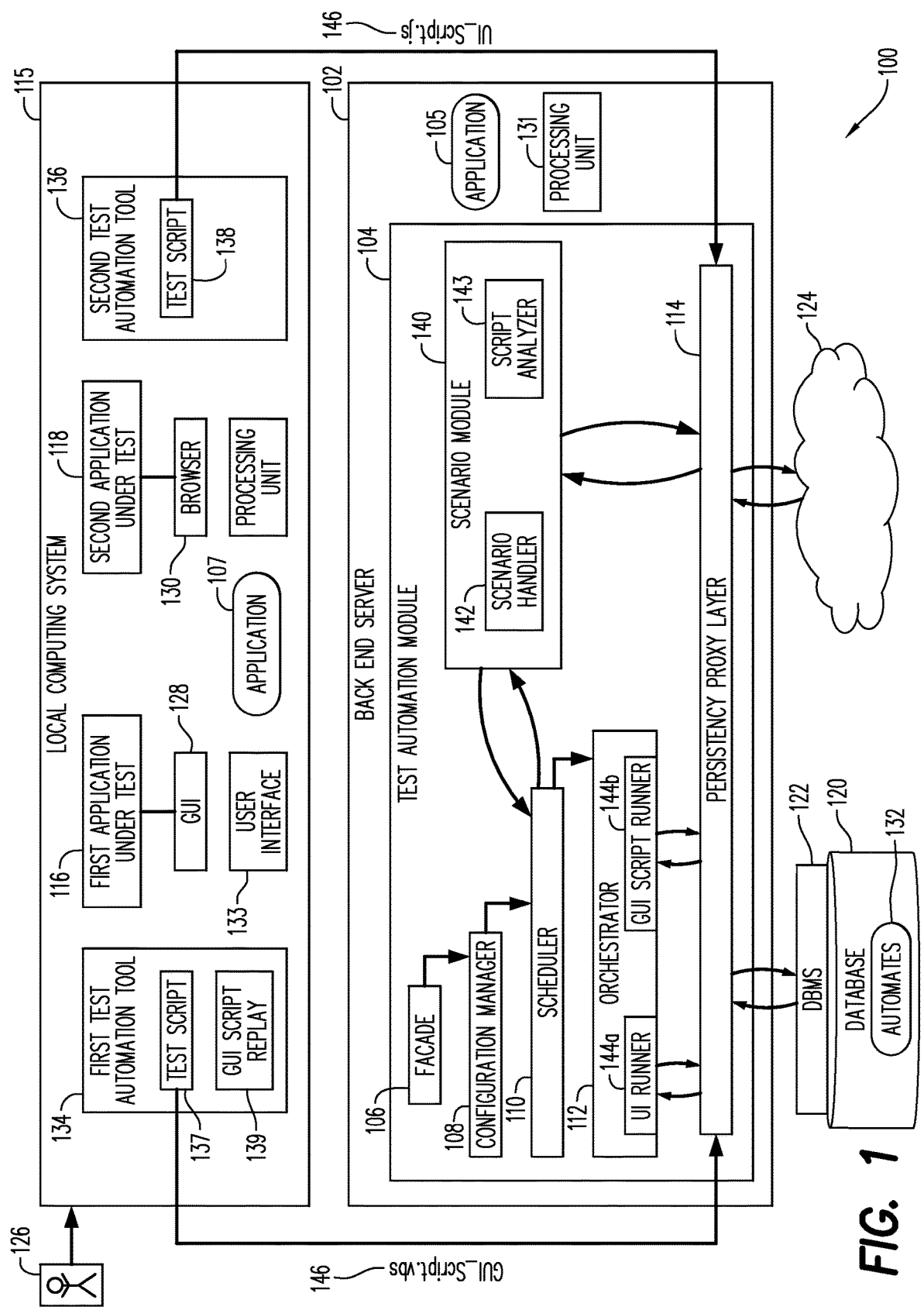
FIG. 1 is a block diagram of an architecture according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, execution of an E2E scenario may include access to several applications. An organization may provide one or more tools that access these multiple applications to create the E2E process. As non-exhaustive examples that will be used in the following discussion, the tools may be SAP GUI® provided by SAP and Fiori® also provided by SAP. SAP GUI (Graphical User Interface) is an Enterprise Resource Planning (ERP) tool that allows end users to use various software applications by providing an easy-to-use graphical interface. Fiori is another user interface (UI)-based ERP tool that contains front-end components for a plurality of applications that may be used on a regular basis. In some instances, the end-user may use both SAP GUI and Fiori to implement the E2E scenario, as the E2E scenario may access applications accessible by the particular tools. As also described above, prior to release, the E2E scenario may be tested to ensure the functionality of the E2E scenario is as expected. The functionality provided by each of the tools may be tested by a specific automation tool. A test automation tool is a tool validates if software is functioning appropriately and meeting requirements before it is released into production. The test automation tool may execute scripted sequences (test scripts) to test the functionality of the software (e.g., ERP tool). With respect to UI applications, the test script may simulate, or mimic, an end user's interaction with the UI application, and in particular, the web objects in the application. As used herein, the terms "automated test script," "automate", "test," "script," "test script" and "automation" may be used interchangeably. In many cases E2E scenarios may not be covered in a single test script, as different tools were used to create the E2E scenario, and so different test automation tools may be used to test different operations of the E2E scenario. For example, eCATT (extended Computer Aided Test Tool) is an automation tool that may be used to create and execute functional test scripts for recording and testing functionality of an operation of a scenario provided by SAP GUI, where each test script generates a detailed log that documents the test process and results. START (Simple Test Automation for Regression Tests) is a test automation tool that may be used to create and execute functional test scripts for recording and testing functionality of an operation of a scenario provided by FIORI. In these cases, multiple scripts may be recorded. In some instances, to test the E2E scenario, a tester may need to toggle between the two (or multiple) scripts to test each operation of the scenario which may be time consuming and error-prone. In other instances, multiple scripts may be combined into a single wrapper script which covers the complete E2E scenario. However, the combined wrapper script may be written in a human un-readable language and may use a non-user-friendly interface, making it challenging for users to debug (e.g., find and fix errors in source code that prevent the E2E process from executing as expected) the E2E scenario, as well as to edit the scripts to fix errors and/or add new/different aspects.

While examples herein may be described with respect to SAPGUI, FIORI, eCATT and START, these examples are for illustrative purposes only.

Pursuant to embodiments, a test automation module is provided to combine the testing from different test automation tools. The test automation module may receive an automated test written in a human-readable plain language, and therefore readable by any user. The test automation module may then provide rules tying the human-readable test to the test scripts created by the test automation tools, such that the whole E2E scenario may be tested without the tester toggling between applications. Embodiments provide for a user to test an E2E scenario using different test automation tools whereby the module switches between test scripts from different test automation tools automatically and smoothly, giving users a good tool for writing and executing test cases.

FIG. 1 is a block diagram of an architecture 100 according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Architecture 100 includes a backend server 102 including a test automation module 104, an application 105, a façade layer 106, a configuration manager 108, a scheduler 110, an orchestrator 112 and a persistency proxy 114. The architecture 100 also includes a local computing system 115 including a first tool 116 (continuing with the non-exhaustive example, this may be SAP GUI), a second tool 118 (continuing with the non-exhaustive example, this may be Fiori), a database 120, a database management system (DBMS) 122, a cloud 124 and a client/user 126. As used herein, the terms "client", "user," "tester" and "end-user" may be used interchangeably.

The backend server 102 may include applications 105. Applications 105 may comprise server-side executable program code (e.g., compiled code, scripts, etc.) executing within the backend server 102 to receive queries/requests from clients 126, via the local computing system 115, and provide results to clients 126 based on the data of database 120, and the output of the test automation module 104. A automate author (user) may access, via the local computing system 115, the test automation module 104 executing within the server 102, to generate an automate that combines scripts from different test automation tools for an automatic and seamless execution, as described below.

The server 102 may provide any suitable interfaces through which users 126 may communicate with the test automation module 104 or applications 105/107 executing thereon. The server 102 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

Local computing system 115 may comprise a computing system operated by local user 126. Local computing system 115 may comprise a laptop computer, a desktop computer, or a tablet computer, but embodiments are not limited thereto. Local computing system 115 may consist of any combination of computing hardware and software suitable to allow system 115 to execute program code to cause the system 115 to perform the functions described herein and to store such program code and associated data.

Generally, computing system 115 executes one or more of applications 107 to provide functionality to user 126. Applications 107 may comprise any software applications that are or become known, including but not limited to data analytics applications. As will be described below, applications 107 may comprise web applications which execute within the first tool 116 or second tool 118 (e.g., a Graphical User Interface 128 with the first tool 116 and a web browser 130 with the second tool 118) of system 115 and interact with corresponding remote cloud-based applications 105 to provide desired functionality. User 126 may instruct system 115, as is known, to execute one or more of applications under test and an associated automate 132. The user 126 may interact with resulting displayed user interfaces 133 output from the execution of applications, to analyze the functionality of the script.

A test automation tool 134/136 may access data in the database 120 and then may reflect/show that information on a user interface 133. The test automation tool 134/136 may fetch the data from the database 120 so that it is provided at runtime. While discussed further below, the database 120 may store data representing the automates 132 and other suitable data. The automates 132 may test the functionality of the E2E scenario under test. Execution of the automate 132 may include performance of activities in a sequence designated by the test automation module 104 using a given payload, as described further below. Database 120 represents any suitable combination of volatile (e.g., Random Access Memory) and non-volatile (e.g., fixed disk) memory used by system to store the data.

Each of the test automation tools 134, 136 may record every end user interaction with the first and second tools 116, 118, respectively, and in particular, the web objects in the application. For example, with respect to the first test automation tool 134, a user may create the test script 137 (e.g., GUI script) via data input (e.g., script name, application component, system data container, version, local object, validation object, a transaction to be recorded (e.g., MM01 transaction) etc.) to the first test automation tool 134 and selection of a "start recording" icon. The first test automation tool 134 then records the steps (e.g., every user interaction with a web object on the UI) as required. After completion of the recording, the recording may be stopped via selection of a "stop recording" icon, and the test script 137 may be saved via selection of a "save" icon. As a non-exhaustive example, the test script 137 output by the first test automation tool 134 (e.g., eCATT) may be visual basic script (vbs), or any other suitable language. A non-exhaustive example of a name of the saved vbs script may be "GUI_script.vbs". With respect to the second test automation tool 136, a user may create a test script 138 (a UI script) via data input (e.g., launch of a URL, entry of a system data container, target system and URL, and selection of a "create" icon). Then an internet tab (e.g., Chrome tab) may be opened according to URL details given. Selection of a "record" icon may record the required steps with importing and exporting parameters. After completion the recording, the recording may be stopped by selection a "stop recording" icon. The script 138 may be generated with the recorded steps, and the test script 138 may be saved via selection of a "save" icon. As a non-exhaustive example, the test script 138 output by the second automation tool 138 may be javascript (js), or any other suitable language. A non-exhaustive example of a name of the saved js script may be "UI_script.js".

The test automation module 104 may include the façade layer 106 (as used herein, the terms "façade" and "façade layer" may be used interchangeably), configuration manager 108, scheduler 110, orchestrator 112, persistency proxy layer 114 and a scenario module 140.

The facade layer 106 may provide a simplified interface to an underlying complex system of objects, classes, libraries and/or frameworks.

The configuration manager 108 may configure test data for use with the system. The configuration manager 108 may also configure other details related to execution of the automates. Non-exhaustive examples of these details include the frequency of running the tests, how the output should be reported, to whom should the output be reported, etc.

The persistency proxy layer 114 may act as an intermediary between the test automation module 104 and the data stores (e.g., database 120 and cloud 124) that store the generated test scripts 132. The test scripts 132 may be accessed via the persistency proxy layer 114 by use of the test script identifier 146.

The orchestrator 112 provides for the integration of the scripts provided by different test automation tools 134/136 to be executed together as part of the E2E scenario. The orchestrator 112 may include a runner 144 for each of the test automation tools. For example, a UI runner 144a may invoke operation of the browser to run the UI_script 138 retrieved via the persistency proxy layer 114. A GUI Script runner 144b, for example, may invoke manipulation of a SAPGUI script replay 139 to run the GUI_script 137 retrieved via the persistency proxy layer 114.

Figure 3:
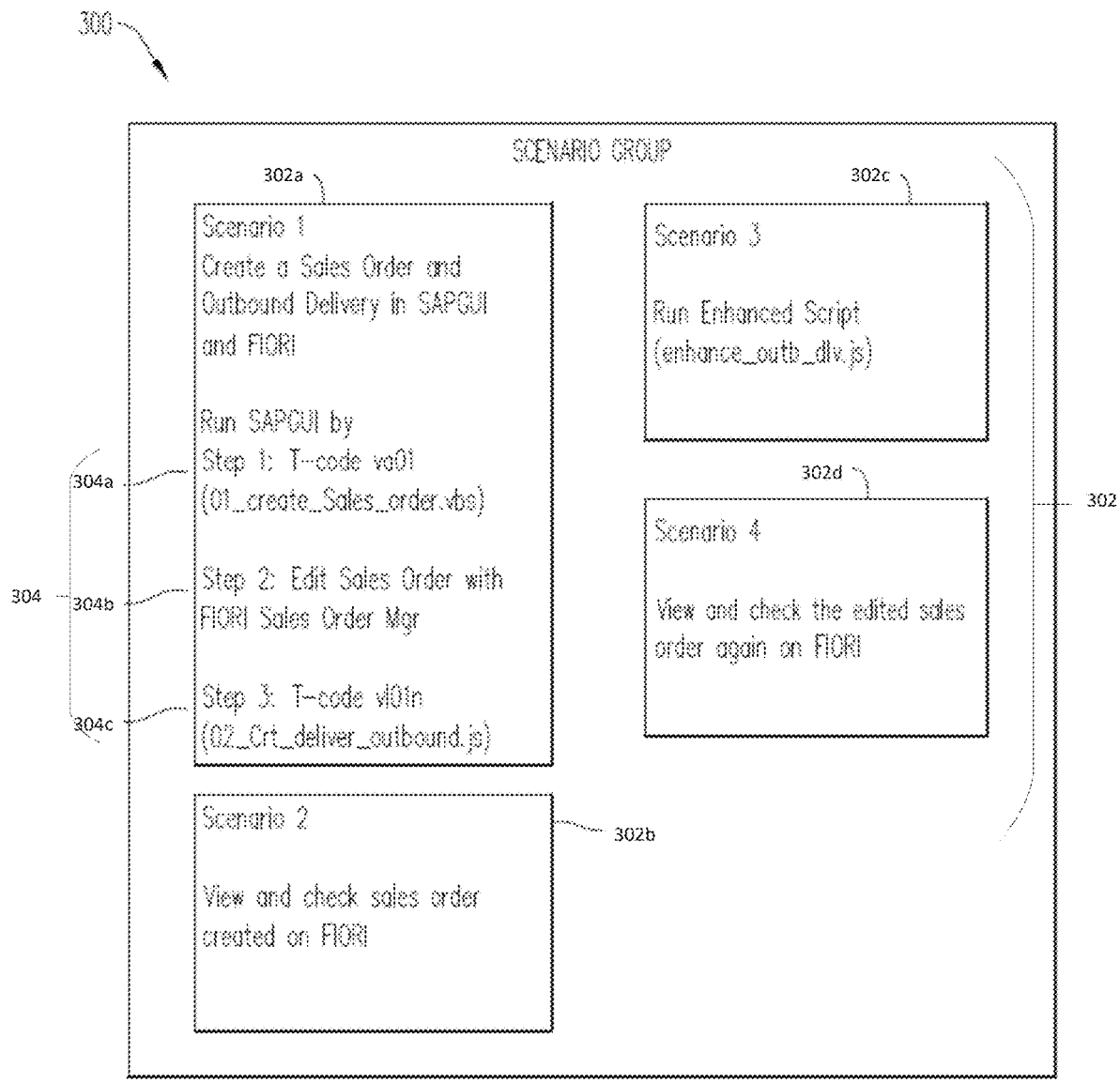
FIG. 3 is an example of a scenario group according to some embodiments.

Scenario module 140 includes a scenario handler 142 and a script analyzer 143/The scenario handler 142 receives a definition of one or more scenario groups 300 (FIG. 3). The scenario handler 142 may also incorporate updates to the scenarios. The script analyzer 143 may scan scripts (recorded and user defined) for patterns indicating problems in code quality, security and performance.

One or more applications 105/107 executing on backend server 102 or local computing system 115 may communicate with DBMS 122 using database management interfaces such as, but not limited to, Open Database Connectivity (ODBC) and Java Database Connectivity (JDBC) interfaces. These types of applications 105/107 may use Structured Query Language (SQL) to manage and query data stored in database 120.

DBMS 122 serves requests to store, retrieve and/or modify data of database 120, and also performs administrative and management functions. Such functions may include snapshot and backup management, indexing, optimization, garbage collection, and/or any other database functions that are or become known. DBMS 122 may also provide application logic, such as database procedures and/or calculations, according to some embodiments. This application logic may comprise scripts, functional libraries and/or compiled program code. DBMS 122 may comprise any query-responsive database system that is or becomes known, including but not limited to a structured-query language (i.e., SQL) relational database management system.

Backend server 102 may provide application services (e.g., via functional libraries) which applications 105/107 may use to manage and query the data of database 120. The application services can be used to expose the database data model, with its tables, hierarchies, views and database procedures, to clients. In addition to exposing the data model, backend server 102 may host system services such as a search service.

Database 120 may store data used by at least one of: applications 105/107 and the test automation module 104. For example, database 120 may store the user-defined data which may be accessed by the test automation module 104 during execution thereof.

Database 120 may comprise any query-responsive data source or sources that are or become known, including but not limited to a structured-query language (SQL) relational database management system. Database 120 may comprise a relational database, a multi-dimensional database, an extensible Markup Language (XML) document, or any other data storage system storing structured and/or unstructured data. The data of database 120 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 102/local computing system 115.

For example, a client 126 may execute a Web Browser to request and receive a Web page (e.g., in HTML format) from a website application 105 of backend server 102 to provide the UI 133 via HTTP, HTTPS, and/or WebSocket, and may render and present the Web page according to known protocols.

Figure 2:
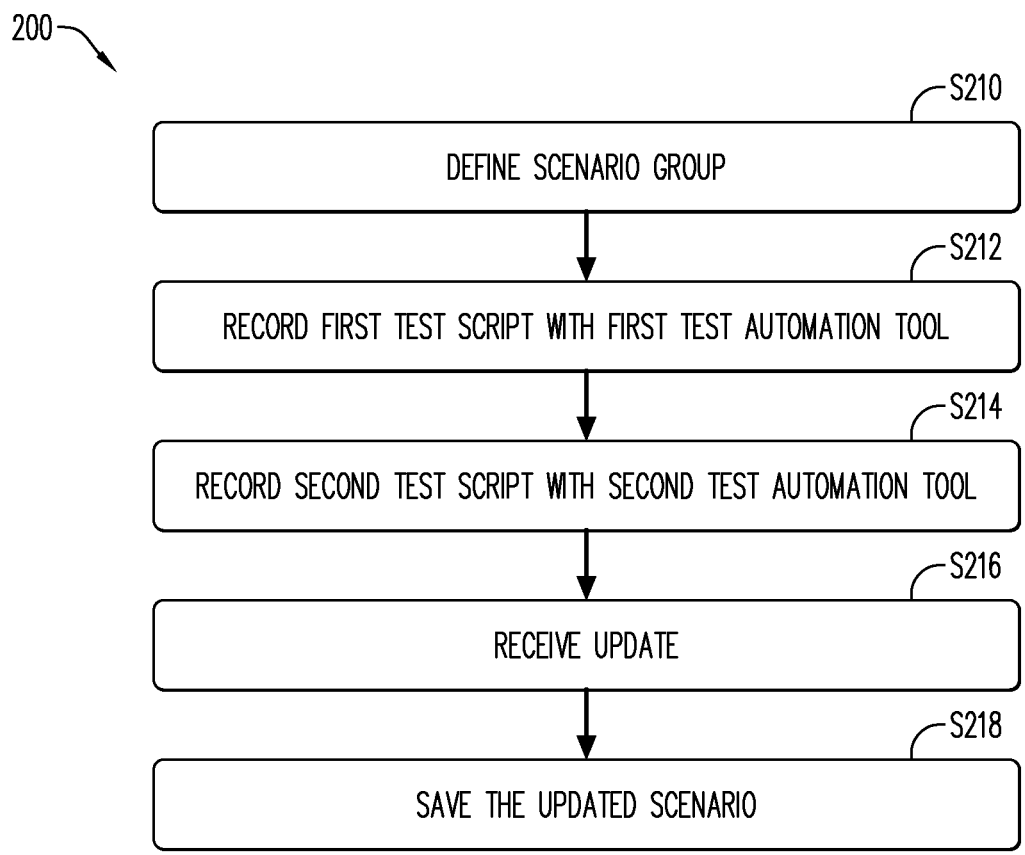
FIG. 2 is a flow diagram of a process according to some embodiments.

FIG. 2 illustrates a process 200 for creating a scenario in accordance with an example embodiment. For example, the process 200 (and process 500/00, described further below)

may be performed by a database node, a cloud platform, a server, a computing system (user device), a combination of devices/nodes, or the like, according to some embodiments. In one or more embodiments, the computing system 115 or backend server 102 may be conditioned to perform the process 200, 500 such that a processing unit 131 (FIG. 1) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a scenario group 300 (FIG. 3) (E2E scenario) is defined. The scenario group 300 may be defined by a test author execution the scenario handler 142. The scenario group 300 may include one or more scenarios 302 that describe operations/steps 304 to execute a task. The scenario 302 may be written in plain text or other human-readable language. In this way, the user writes plain text instructions that inform the system of the steps rather than writing computer code describing the steps. As a non-exhaustive example, the scenario 302 may be written in Gherkin language, which is a human-readable language used with Cucumber or Cucumber.js. Cucumber and Cucumber.js are tools for running automated tests written in plain language. Pursuant to some embodiments, after writing the scenario in plain text (which may make it easier for others to understand, the test author may then provide the machine-readable code 400 (FIG. 4) for executing the scenario, such that the developer may provide both a human-readable scenario and a machine-readable code that may be executed to complete the steps 304 of the human-readable scenario.

Each scenario 302 may include one or more steps 304 that may be executed to complete each scenario 302. Definition of the steps may be a pre-requisite to executing the multiple scripts for the E2E scenario. In some embodiments, the step 304 may include a transaction code (T-code) used to execute the particular task. As used herein, a T-code may be the entry point to enter and use a screen flow that may eventually be part of a process. The transaction may be one piece representing one activity in a process and may be used for example, for creating new records, modifying data, viewing data, reporting, etc. Instead of a T-code, other steps may include instructions to access a particular URL.

In the non-exhaustive example shown in FIG. 3, these steps 304 may be written in plain text as four scenarios 302 *a, b, c, d* of a scenario group 300. As shown herein, Scenario 1 (302*a*) is the creation of a Sales Order (SO) and Outbound delivery (Outb Dlv) in SAPGUI and Fiori UI; Scenario 2 (302*b*) describes an assertion via viewing and checking the sales order created on Fiori UI; Scenario 3 (302*c*) describes running an enhanced script, which may include edits to the sales order in the code for the script itself; and Scenario 4 (302*d*) describes another assertion via viewing and checking the edited sales order again on Fiori UI.

Then in S212, a first test script is recorded for a step 304 of the scenario 302 that includes the recording of a test script. It is noted that while the examples herein describe the first step as recording a test script, in other instances, there may be steps prior to recording the test script. The first test script 137 may be recorded by the first test automation tool 134 as the scenario describes the step as being performed by the first tool 116. The recorded first test script 137 may be saved to a suitable data store (e.g., database 120, cloud 124) and a test script identifier 146 may be saved to a persistency proxy layer 114. The test script identifier 146 may the file name used to save the test script or any other suitable identifier. As will be described further below, the persistency proxy layer 114 may provide access to the test scripts—via the test script identifier 146—during runtime of the automate.

Next, at S214, a second test script 138 is recorded for another step 304 of the scenario 302 that includes the recording of another test script. As above, it is noted that while the examples herein describe the second step as recording another test script, in other instances, there may be steps in between the recording of the first test script and the recording of the second test script. The second test script 138 may be recorded by the second test automation tool 136 in a case the scenario describes a step as being performed by the second tool 118. The recorded second test script 138 may be saved to a suitable data store (e.g., database 120, cloud 124) and a test script identifier 146 may be saved to a persistency proxy layer 114.

After the test scripts have been recorded, one or more updates are received at the scenario handler 142 in S216. In some embodiments, the update may be to the scenario 302 and include data from the test scripts, assertions, enhancement, details including how to log on to the tool, security information for login, authorizations, authentications, what fields need verification, more specifics of what should be tested, etc., resulting in updated scenarios. As a non-exhaustive example, the scenario 302 may be updated with the test script identifiers 146. An assertion may be a statement that enables the testing of some of the steps and an assertion may be included in the scenario initially or as an update. A non-exhaustive example of an assertion may be "View and check the edited sales order." In some embodiments, the update may include an update or enhancement to the test script. As a non-exhaustive example, the test script may be enhanced with code related to a delivery option. Conventionally, the test automation tools support recording of the script in a fixed format. Embodiments provide for the test scripts to be changed or edited based on the format used to save the script. For example, a test script saved as a vbs script may be edited using vb grammar. Those changes may be put into the persistency proxy layer 114. A benefit of the ability to edit the test script is that a minor change (e.g., an input of the transaction, a choice of the transaction, etc.) may be made directly to the test script without recording the steps again.

Then the updated scenario is saved at S218.

Continuing with the example shown in FIG. 3, for Scenario 1 and the creation of a Sales Order and Outbound Delivery, the first step 304*a* is T-code va01, which creates a vbs test script for creating a sales order (01_create_Sales_order.vbs). This step records, by the first test automation tool 134, a test script for creating a sales order, via the first tool 116 (SAPGUI), as in S212, for example. The test script may be saved with test script identifier 146 "01_create_Sales_order.vbs". A sales order number may be output from execution of the sales order test script. Although not shown, the sales order number result may be stored as "last so number".

The second step 304*b* is to Edit the Sales Order with the Fiori Application Sales Order Manager. As described above, the initial scenario may be updated with further details. The second step 304 shown herein may be updated to include instructions to follow the URL "edit sales_order" (which is an attribute in config.json which delegates to the URL) with "user_name/password" (an attribute in config.json which delegates login user name password) to edit the sales order saved as "last_so_number" by appending a sales order item to the sales order. Pursuant to some embodiments, these updates to the scenario 302 may occur before or after recording the steps for updated the sales order. Irrespective of when the updates are added to the scenario 302, the steps for updating the sales order may be recorded by the second test automation tool 136 and the test script for these steps is generated automatically as the output js code, which may be stored with a test script identifier 146.

The third step 304*c* is T-code v101n, which creates an outbound delivery for the sales order number output in Step 1. Similarly, to Step 1, Step 3 records, by the first test automation tool 134 (SAPGUI), a test script for creating the outbound delivery, via the first tool 116, and saves the script as js code "02_Crt_deliver_outbound.js". It is noted that SAP GUI can replay both vbs and js scripts. An outbound delivery number may be the output from execution of the outbound delivery test script. Although not shown, the outbound delivery number result may be stored as "last_outb_dlv_number." Other steps may be added to the scenario during editing. As a non-exhaustive example, following the recordation of the test script for creating the outbound delivery, there may be the following steps: Step 4—wait 10 seconds; Step 5—within the second tool 118 (Fiori), follow URL "view_Delivery" with "user_name/password" to view the outbound delivery, "last_outb_dlv_number"; Step 6—check the attribute "carrier" is set; Step 7—within Extension, enhance the outbound delivery by "enhance_outb_dlv.js". It is noted that the Extension allows the user/developer to add additional aspects to the code beyond that created by recordation of the test script; Step 8—within the second tool 118 (Fiori), follow URL "view_Delivery" with "user_name/password" to view outbound delivery "last_outb_dlv_number".

FIG. 4 is a display 400 provided by the scenario handler 142 including machine-readable code 402 for execution if a plain text scenario 404. The test author or other tool (e.g., Cucumber js) creates a mapping from the plain text scenario 404 to the machine-readable code 402 in the form of function calls 406 and other suitable machine-readable code. In some embodiments, the function calls 406 may use Application Programming Interfaces (API)s to facilitate the execution of the steps. During execution, for the non-exhaustive example of work.js shown herein, the system will interpret "Given Login to SAPGUI" by going to the function call 406*a*. The function call 406*a* for the log-in may be enhanced by the introduction of a scheduler (api.scheduler.call_SAPGUI_script ("va01", "abc.vbs") to run a log-in test script during a run-time. The machine-readable code 402 may also be enhanced by storage after creation of the Sales Order, as provided by another function call 406*b* (var result_of_last_so=api.storage ("last_so_number")). Another enhancement to the machine-readable code 402 may be the inclusion of an assertion. The assertion may have a value from the user interface retrieved for verification (result_of_last_so=1). In some embodiments, machine-readable coded steps may access libraries during execution thereof. The ability to enhance the machine-readable code, as provided by embodiments, is a departure from conventional scripts that may not be edited.

Figure 5:
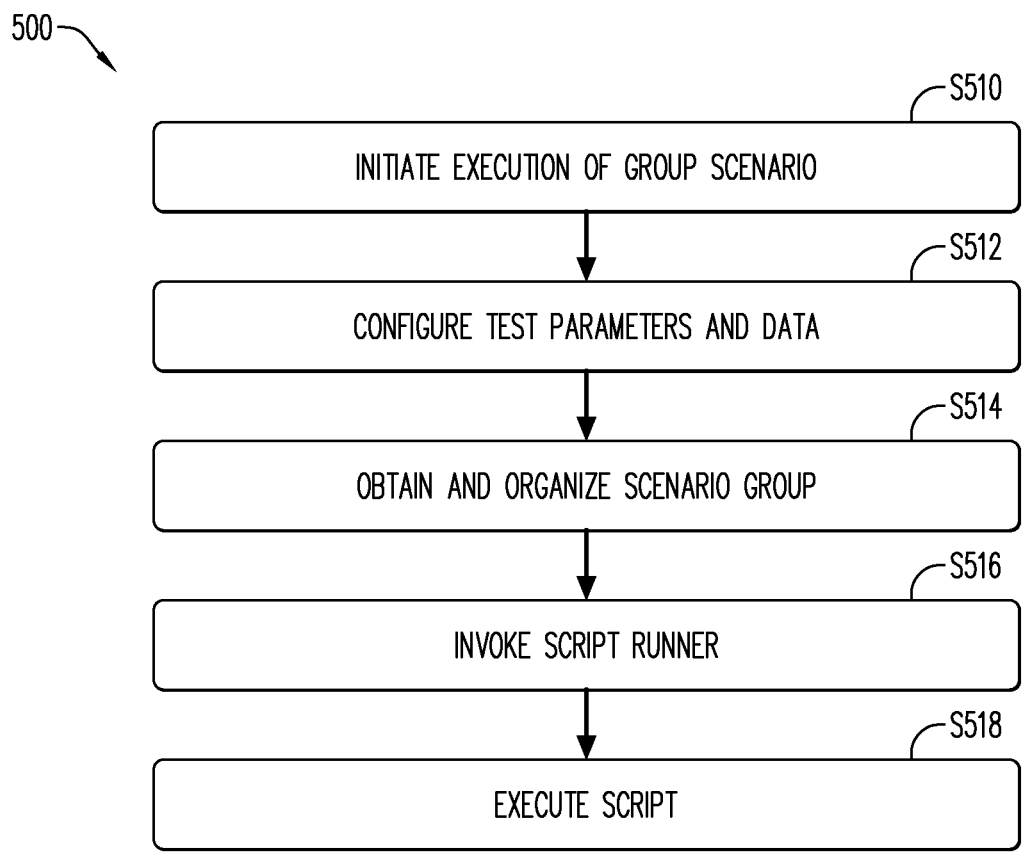
FIG. 5 is a flow diagram according to some embodiments.
Figure 6:
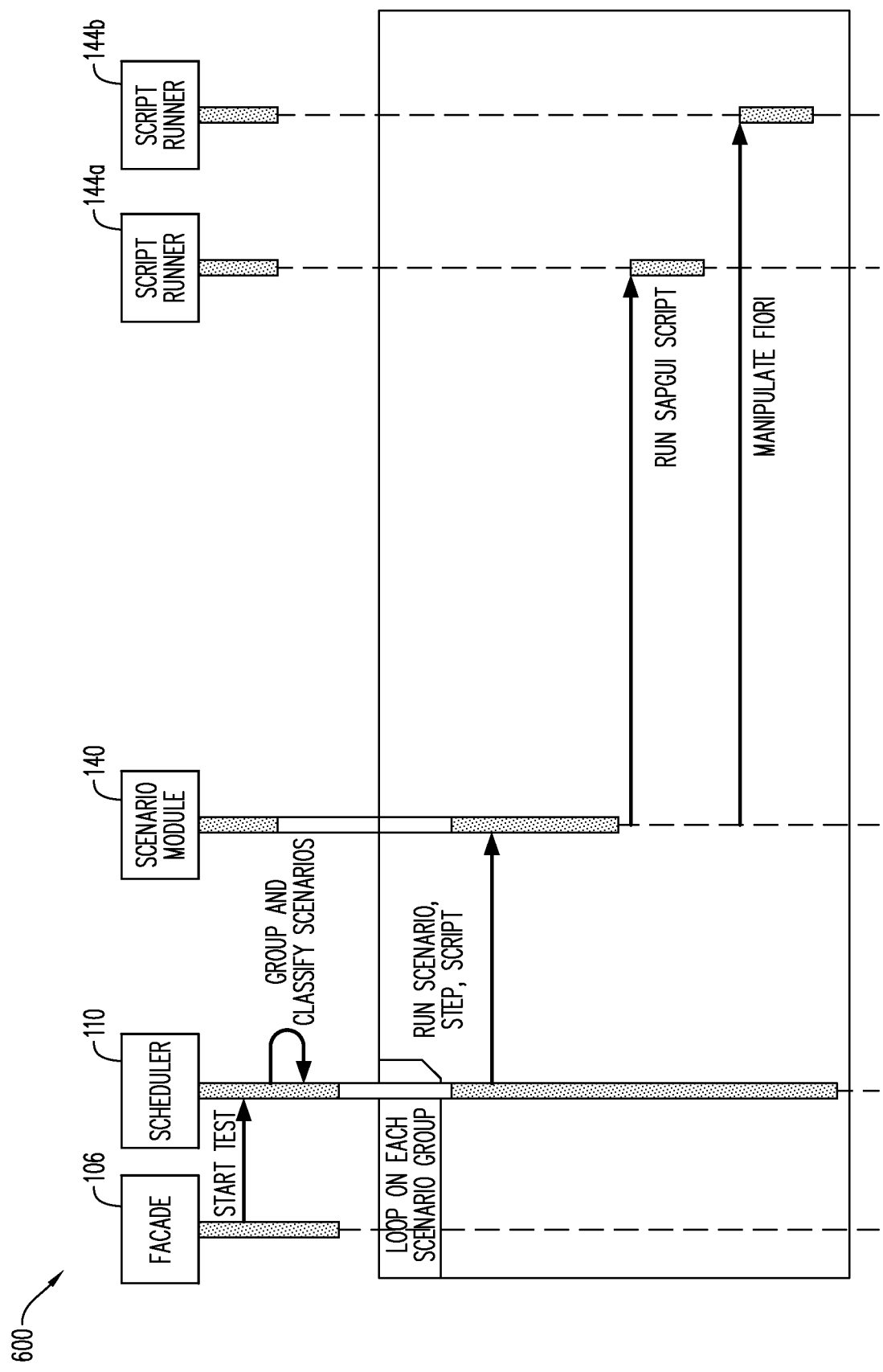
FIG. 6 is a block diagram for executing a group scenario according to some embodiments.

FIGS. 5 and 6 illustrate a process 500 and block diagram 600 for executing a test of a group scenario (E2E scenario) in accordance with an example embodiment.

Initially, at S510 execution of the test for the group scenario (E2E scenario) by the test automation module 104 is initiated. The test may be initiated by a user. In some embodiments, the user may initiate the group scenario test at the test automation module 104 via a simplified interface, including but not limited to the facade layer 106. The facade layer 106 may receive the user's input parameters (e.g., test data).

Then, at S512, the configuration manager 108 may configure the test parameters including the test data. The configuration manager 108 may combine configuration parameters and send the configuration data to the scheduler 110.

The scheduler 110 may, at S514, access the scenario module 140 to obtain the scenario group 300 and organize the scenario group 300 by classifying and grouping the steps 304 of the individual scenarios 302 and arranging an order for execution of the steps. The scheduler 110 may identify any user-defined scripts called in a step as a result of an edit. The scheduler 110 may run the scripts (both recorded and user-defined scripts) through a script analyzer 143 to, as described above, scan the scripts and search for patterns indicating problems in code quality, security or performance. In a case the script analyzer 143 determines there may be a problem with the user-defined script, a notification may be included in a report and/or sent to a user and/or administrator.

As part of arranging the execution of the steps, the scheduler 110 may identify test scripts in the steps and transmit the scripts to the orchestrator 112. The orchestrator 112 may invoke an appropriate runner 144 (e.g., UI runner 144*a* for FIORI application under test and GUI Script runner 144*b* for SAPGUI application under test) to run the particular test scripts in S516. The orchestrator 112 may invoke the appropriate runner based on the data in the steps. For example, the steps may include plain text of "send this test script to the API for the SAPGUI runner," and the corresponding machine-readable code, which is received by the scheduler 110. When transmitting the scripts to the orchestrator 112, the scheduler 110 may also indicate to the orchestrator 112 the appropriate runner 144 that should be invoked based on the machine-readable code. The script runner 144 then executes the script with the respective application under test in S518.

Figure 7:
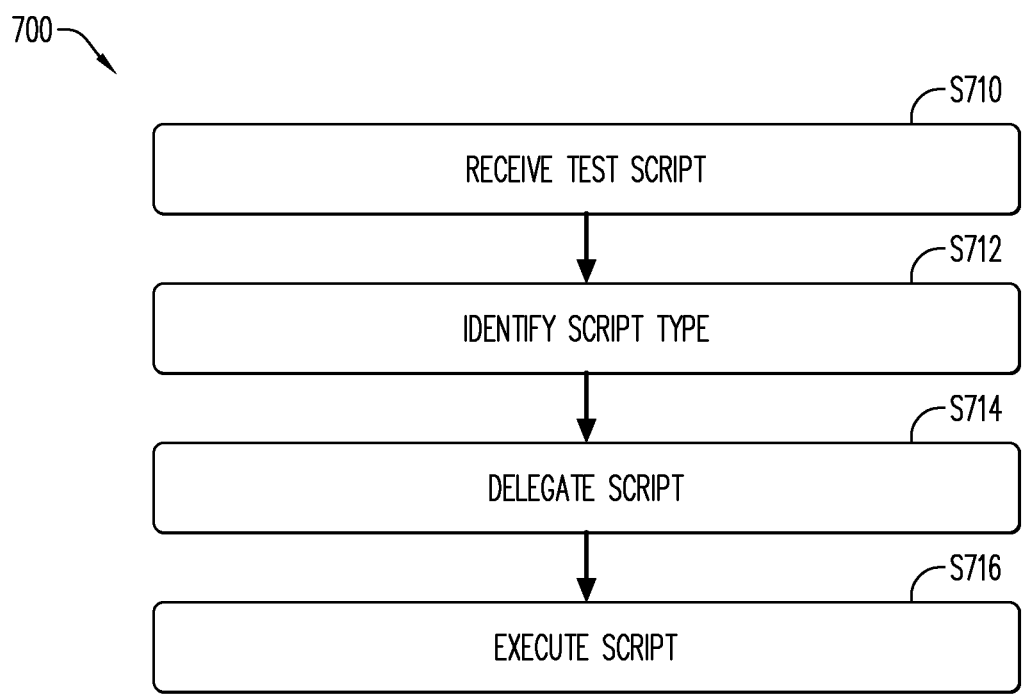
FIG. 7 is a flow diagram according to some embodiments.
Figure 8:
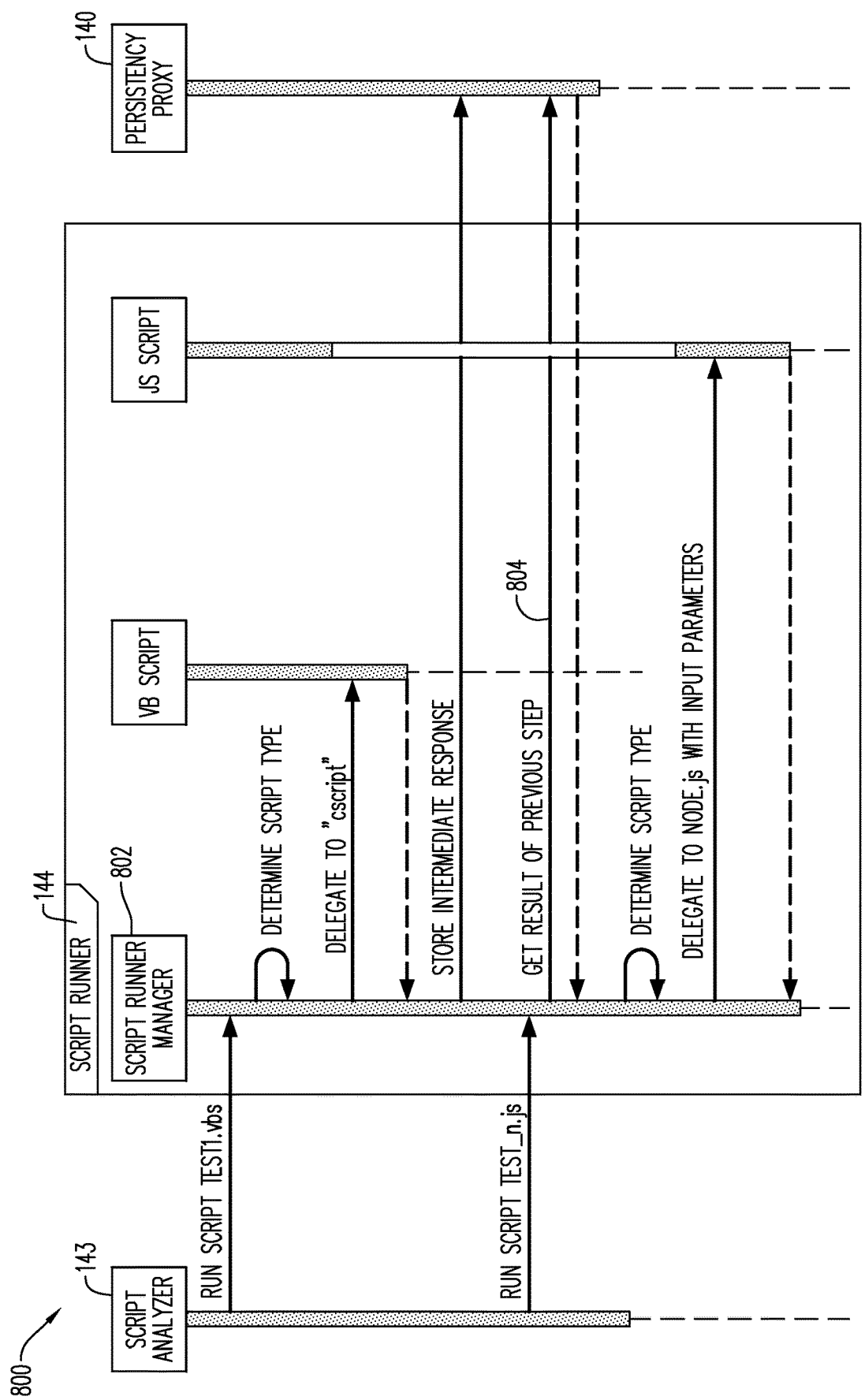
FIG. 8 is a block diagram according to some embodiments.

FIGS. 7 and 8 illustrate a process 700 and block diagram 800 for executing a script runner 144. While the script runner shown herein is SAP GUI Script runner, the block diagram may apply to other script runners. Pursuant to embodiments, a script runner may support multiple runtime languages, including but not limited to, VB script and JS script.

Initially at S710, test scripts are received at a script runner manager 802 of the script runner 144. Then at S712, the script runner manager identifies the script type (e.g., VB script or JS script) for each script. As shown herein, the script runner manager 802 receives test scripts (test1_vbs and tst_n.js) from the script analyzer 143 of the scenario module 140 with an instruction to run those tests scripts. Then, at S714, the script runner manager 802 delegates the identified script to an appropriate runtime environment for execution. Herein, the vb script is delegated to "cscript"

runtime environment and the js script is delegated to "Node.js" runtime environment with input parameters. The script is executed in S716.

Pursuant to some embodiments, the script runner 144 may also save the output of a previous script ("intermediate result") 804 to the appropriate storage though the persistency proxy layer 114. The script runner manager 802 may also retrieve this intermediate result 804 and supply it to the next test script that needs this parameter.

Figure 9:
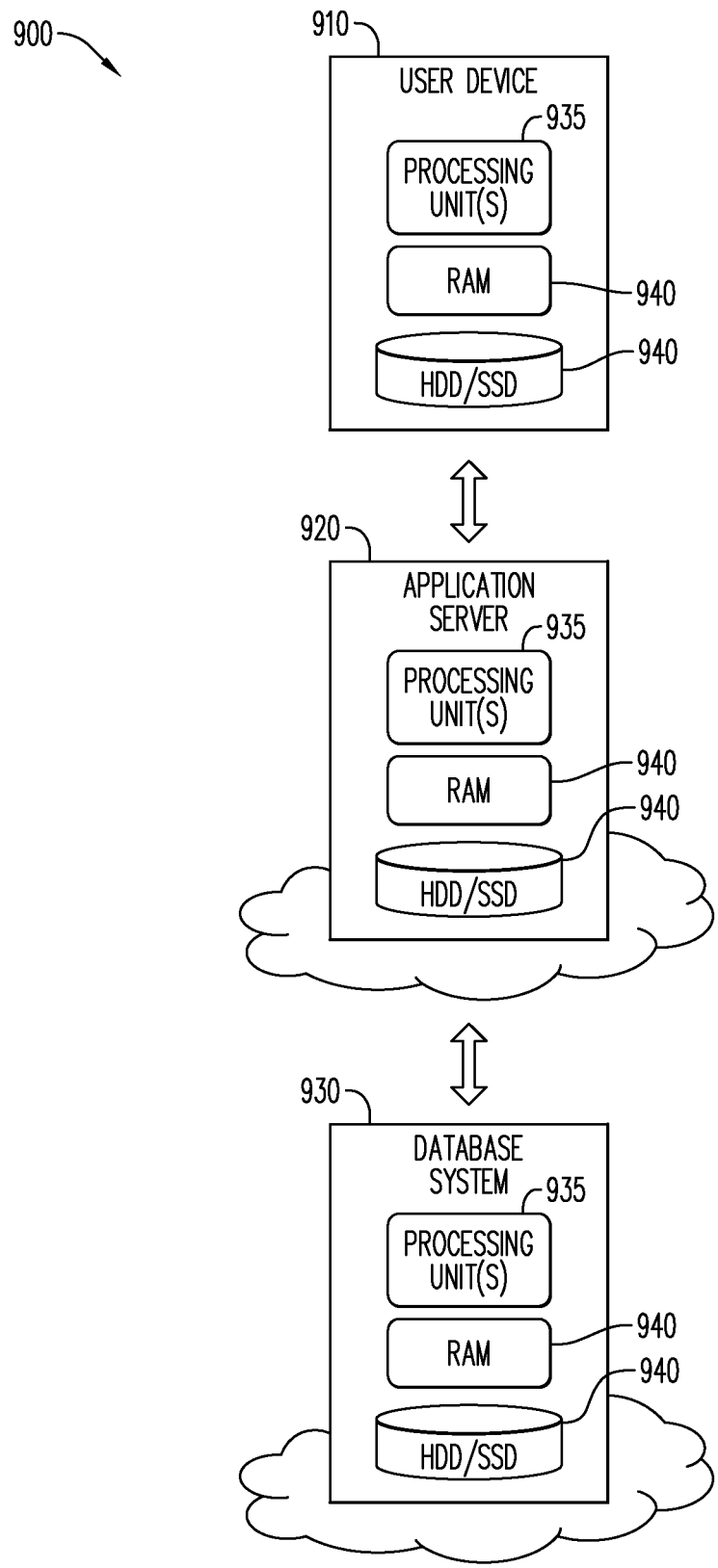
FIG. 9 is a block diagram of a cloud-based database deployment architecture according to some embodiments.

FIG. 9 illustrates a cloud-based database deployment 900 according to some embodiments. The illustrated components may reside in one or more public clouds providing self-service and immediate provisioning, autoscaling, security, compliance and identity management features.

User device 910 may interact with applications executing on the application server 920 (cloud or on-premise), for example via a Web Browser executing on user device 910, in order to create, read, update and delete data managed by database system 930. Database system 930 may store data as described herein and may execute processes as described herein to cause the execution of the test automation module 104 for use with the user device 910. Application server 920 and database system 930 may comprise cloud-based compute resources, such as virtual machines, allocated by a public cloud provider. As such, application server 920 and database system 930 may be subjected to demand-based resource elasticity. Each of the user device 910, application server 920, and database system 930 may include a processing unit 935 that may include one or more processing devices each including one or more processing cores. In some examples, the processing unit 935 is a multicore processor or a plurality of multicore processors. Also, the processing unit 935 may be fixed or it may be reconfigurable. The processing unit 935 may control the components of any of the user device 910, application server 920, and database system 930. The storage devices 940 may not be limited to a particular storage device and may include any known memory device such as RAM, ROM, hard disk, and the like, and may or may not be included within a database system, a cloud environment, a web server or the like. The storage 940 may store software modules or other instructions/executable code which can be executed by the processing unit 935 to perform the method shown in FIGS. 2/5/7. According to various embodiments, the storage device 940 may include a data store having a plurality of tables, records, partitions and sub-partitions. The storage device 940 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   A memory storing processor-executable program code of a test automation module; and
   A processing unit to execute the processor-executable program code to cause the system to:
   receive a definition for a test end-to-end scenario, the definition including a plurality of operation steps, wherein the scenario comprises a first operation step executable by a first application under test and a second operation step executable by a second application under test, wherein the first application under test is different from the second application under test;
   record a first test script for the first operation step of the test end-to-end scenario with a first automation tool;
   record a second test script for the second operation step of the test end-to-end scenario with a second automation tool;
   receive a first test script identifier for the recorded first test script and a second test script identifier for the second test script at a persistence proxy layer, wherein the recorded first test script is stored in the persistence proxy layer with the first test script identifier, and the recorded second test script is stored in the persistence proxy layer with the second test script identifier;
   update the definition of the test end-to-end scenario with the test script identifiers and data from the recorded first test script and the recorded second test script to output an updated scenario;
   receive the recorded first test script and the recorded second test script of the updated scenario at an orchestrator;
   identify, by the orchestrator, one of the first application under test and the second application under test for each operation step in the updated scenario; and in response to identification of one of the first application under test and the second application under test for each operation step in the updated scenario via the respective first test script identifier and second test script identifier, execute, by accessing one of the first test script and the second test script by a respective test script identifier, one of the first test script via the first application under test and the second test script via the second application under test based on the updated test end-to-end scenario definition, wherein the execution of the first test script via the first application under test and the second test-script via the second application under test switches automatically between the first test script and the second test script per the updated scenario.

2. The system of claim 1, wherein the definition is written in plain text.

3. The system of claim 1, wherein each of the first test script and the second test script is one of a Visual Basic (VB) script or a Java Script (JS) script.

4. The system of claim 1, wherein the updated scenario includes at least one of the first test script identifier and the second test script identifier, one or more verification fields, security log-in data, authentication data, and authorization data.

5. The system of claim 1, further comprising processor-executable program code to cause the system to:
receive, at a scheduler, configuration data for execution of the first test script and the second test script.

6. The system of claim 5, wherein the scheduler receives the updated scenario and arranges an order for execution of the plurality of operation steps.

7. The system of claim 6, wherein the first application under test is a first user interface tool and the second application under test is a second user interface tool different from the first user interface tool.

8. The system of claim 7, wherein the first automation tool includes a first tool recording element and the second automation tool includes a second tool recording element.

9. The system of claim 1 further comprising a first test runner and a second test runner, wherein the first test runner is adapted to execute the first test script via the first application under test and the second test runner is adapted to execute the second test script via the second application under test.

10. The system of claim 1, wherein the identification of one of the first application under test and the second application under test for each operation step is based on the definition for the updated scenario.

11. A method comprising:
receiving a definition for a test end-to-end scenario, the definition including a plurality of operation steps, wherein the scenario comprises a first operation step executable by a first application under test and a second operation step executable by a second application under test, wherein the first application under test is different from the second application under test;
recording a first test script for the first operation step of the test end-to-end scenario with a first automation tool;
recording a second test script for the second operation step of the test end-to-end scenario with a second automation tool;
receiving a first test script identifier for the recorded first test script and a second test script identifier for the second test script at a persistence proxy layer, wherein the recorded first test script is stored in the persistence proxy layer with the first test script identifier, and the recorded second test script is stored in the persistence proxy layer with the second test script identifier;
updating the definition of the test end-to-end scenario with the test script identifiers and data from the recorded first test script and the recorded second test script to output an updated scenario;
receiving the recorded first test script and the recorded second test script of the updated scenario at an orchestrator;
identifying, by the orchestrator, one of the first application under test and the second application under test for each operation step in the updated scenario; and
in response to identification of one of the first application under test and the second application under test for each operation step in the updated scenario via the respective first test script identifier and second test script identifier, executing, by accessing one of the first test script and the second test script by a respective test script identifier, one of the first test script via the first application under test and the second test script via the second application under test based on the updated test end-to-end scenario definition, wherein the execution of the first test script via the first application under test and the second test-script via the second application under test switches automatically between the first test script and the second test script per the updated scenario.

12. The method of claim 11, wherein each of the first test script and the second test script is one of a Visual Basic (VB) script or a Java Script (JS) script.

13. The method of claim 11, wherein the updated scenario includes at least one of the first test script identifier and the second test script identifier, one or more verification fields, security log-in data, authentication data, and authorization data.

14. The method of claim 11, further comprising:
receiving, at a scheduler, configuration data for execution of the first test script and the second test script.

15. The method of claim 14, wherein the scheduler receives the updated scenario and arranges an order for execution of the plurality of operation steps.

16. The method of claim 11, wherein execution of the first test script is via a first test runner and execution of the second test script is via a second test runner.

17. The method of claim 11, wherein the identification of one of the first application under test and the second application under test for each operation step is based on the definition for the updated scenario.

18. A non-transitory, computer readable medium having executable instructions stored therein to perform a method, the method comprising:
receiving a definition for a test end-to-end scenario, the definition including a plurality of operation steps, wherein the scenario comprises a first operation step executable by a first application under test and a second operation step executable by a second application under test, wherein the first application under test is different from the second application under test;
recording a first test script for the first operation step of the test end-to-end scenario with a first automation tool;
recording a second test script for the second operation step of the test end-to-end scenario with a second automation tool;
receiving a first test script identifier for the recorded first test script and a second test script identifier for the second test script at a persistence proxy layer, wherein the recorded first test script is stored in the persistence proxy layer with the first test script identifier, and the recorded second test script is stored in the persistence proxy layer with the second test script identifier;

updating the definition of the test end-to-end scenario with the test script identifiers and data from the recorded first test script and the recorded second test script to output an updated scenario;

receiving the recorded first test script and the recorded second test script of the updated scenario at an orchestrator;

identifying, by the orchestrator, one of the first application under test and the second application under test for each operation step in the updated scenario; and in response to identification of one of the first application under test and the second application under test for each operation step in the updated scenario via the respective first test script identifier and second test script identifier, executing, by accessing one of the first test script and the second test script by a respective test script identifier, one of the first test script via the first application under test and the second test script via the second application under test based on the updated test end-to-end scenario definition, wherein the execution of the first test script via the first application under test and the second test-script via the second application under test switches automatically between the first test script and the second test script per the updated scenario.

19. The medium of claim 18, further comprising:
receiving, at a scheduler, configuration data for execution of the first test script and the second test script.

20. The method of claim 18, wherein the identification of one of the first application under test and the second application under test for each operation step is based on the definition for the updated scenario.

* * * * *